July 14, 1959
G. LISSAC
2,894,429
SPECTACLES
Filed April 1, 1953
3 Sheets-Sheet 1
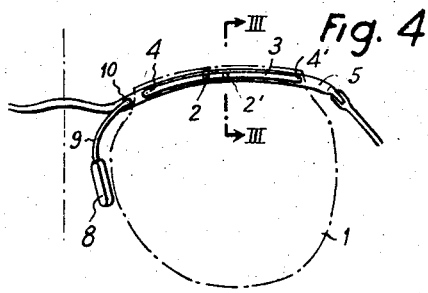
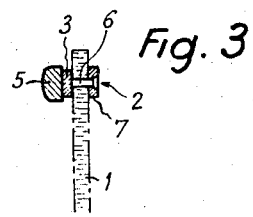
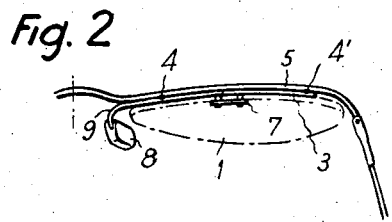
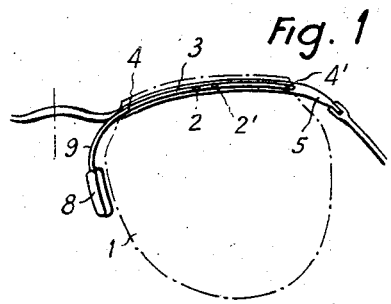
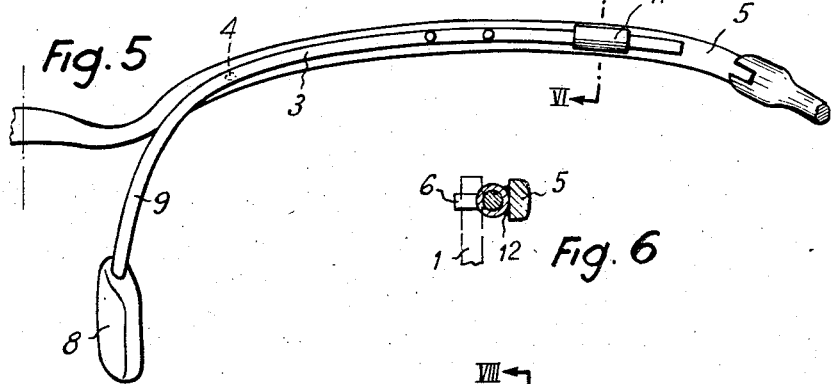
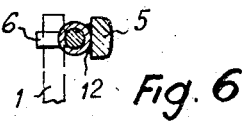
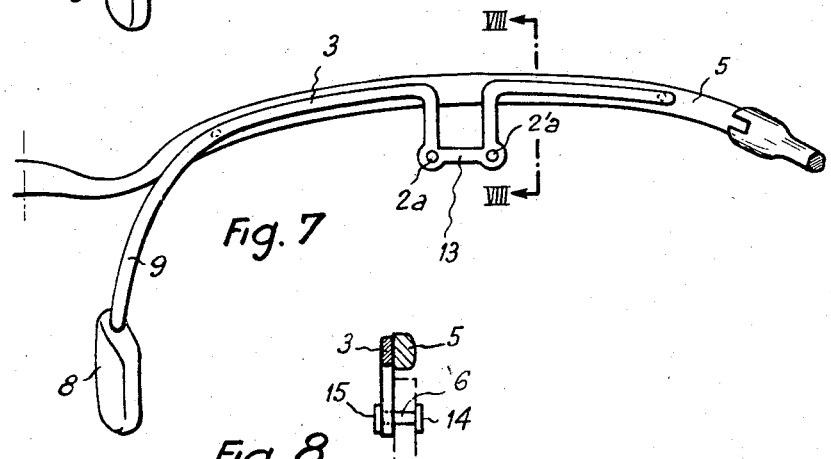
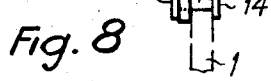

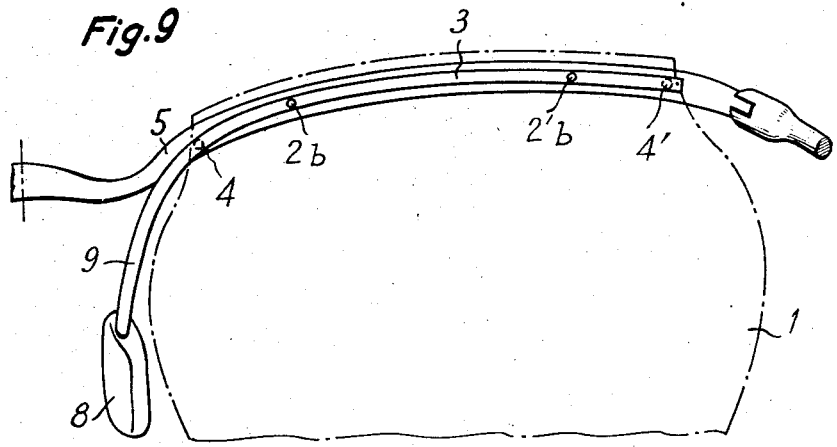
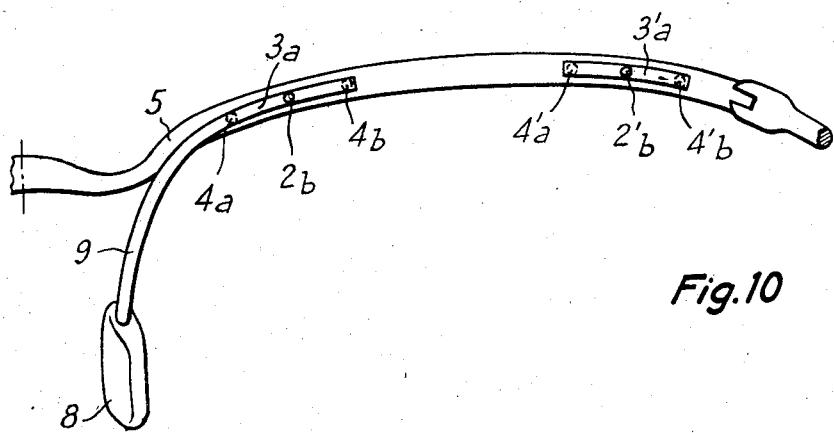
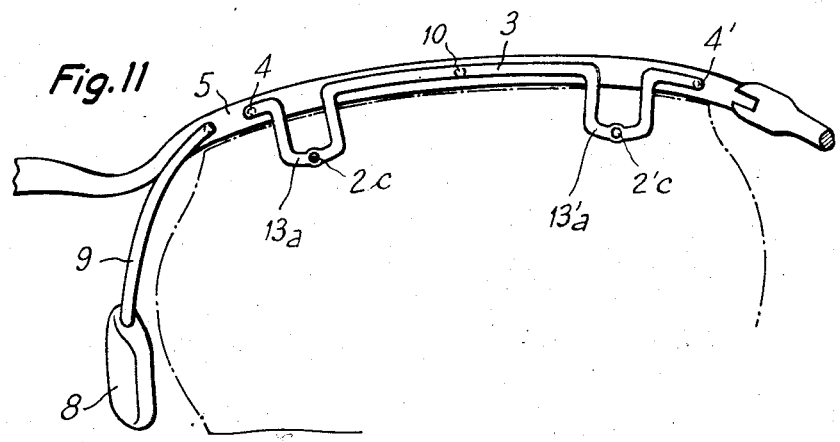

July 14, 1959  G. LISSAC  2,894,429
SPECTACLES

Filed April 1, 1953  3 Sheets-Sheet 3

United States Patent Office 2,894,429
Patented July 14, 1959

2,894,429
SPECTACLES

Georges Lissac, Paris, France

Application April 1, 1953, Serial No. 346,197

Claims priority, application France April 5, 1952

1 Claim. (Cl. 88—47)

Spectacles are already known in which each glass, or the rim surrounding it, is secured to one end of a comparatively long arm the other end of which is attached, e.g. soldered, to the main bar of the spectacles.

In such construction, where the glass-supporting arm is long enough to possess some flexibility, it is principally stressed in flexion.

The applicant has found that the greater number of the advantages resulting from such construction (viz. protection against impact, ready adjustment of the position of the glass with respect to the user's eye) could also be obtained by the use of a different arrangement wherein the element supporting the glass or the surrounding rim is principally stressed in torsion.

In this novel arrangement according to the invention, the glass (actually made of glass or of plastic material) or the surrounding rim is mounted on a torsional bar rigidly connected with the main supporting bar of the spectacles at two points located to either side of the point at which the glass or rim is mounted on the torsion bar.

The flexibility of this torsion bar may be adjusted at will in accordance with the cross section of the bar, the nature of the material from which it is made and the spacing between the points of attachment.

This arrangement may be carried out in various ways some examples of which are given in the ensuing disclosure made with reference to the accompanying drawings wherein:

Figure 1 is a rear elevational view of one half of a pair of spectacles designed according to the invention, in a first form of embodiment thereof;

Figure 2 is a corresponding plan view;

Figure 3 is a section, on an enlarged scale, on line III—III of Figure 1;

Figure 4 is a view similar to Figure 1, but relating to a modified construction;

Figure 5 is a view similar to Figure 1, but on an enlarged scale and relates to a further structural modification;

Figure 6 is a section on line VI—VI of Figure 5;

Figure 7 is a view similar to Figures 1, 4 and 6, relating to yet a further modification;

Figure 8 is a section on line VIII—VIII of Figure 7;

Figure 9 illustrates in rear elevation one half of a pair of spectacles constructed according to the invention;

Figure 10 is a view similar to Figure 9 but relates to a structural modification;

Figures 11 to 14 are views similar to Figures 9 and 10 wherein the glass is secured in such a way as to lie below the main bar.

Figure 12:
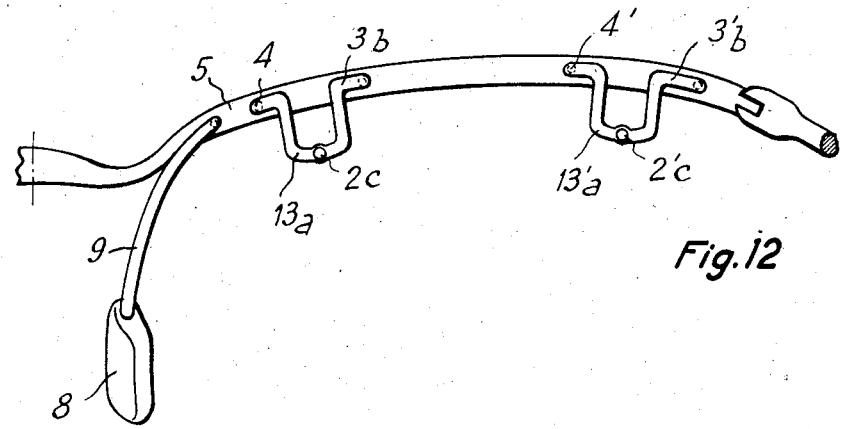

As shown in the form of embodiment illustrated in Figures 1 and 3, this construction derives from a known type of applicant's spectacles to the extent that the glass supporting bar 3 and the rod 9 supporting the nose-rest constitute an integral element soldered as at 4 behind the main bar of the spectacles; however, in the form of construction now described, the glass-supporting bar 3 is, according to the invention, extended on the side remote from the point of attachment 4, beyond the points 2 and 2' at which the glass 1 is supported from the bar 3, and the extension is secured at 4' to the rear of the main bar 5, whereby the glass-supporting bar 3 may be made to operate predominantly in torsion.

This leads to the type of spectacles illustrated in Figures 1 to 3, only one half of which has been shown in the drawings, the other half being identical; in this construction, the glass 1 may for example be secured at two points 2 and 2' to a torsion bar 3 which is secured at both ends at 4 and 4' to the rear of the main bar 5 of the glasses.

This attachment of the torsion bar 3 to the main bar 5 may be effected in any suitable way, as by soldering for instance. Any suitable means may be used for mounting the glass 1 on the torsion bar 3, for example by means of two pins 6 (see Figure 3) extending through holes formed in the glass, the said two pins 6 being for instance soldered to the torsion bar 3 and having their other ends riveted for example to a small plate 7 supported against the rear side of the glass. The two pins may alternatively terminate in a threaded portion adapted to receive a retainer nut clamping the glass 1 against the bar 3. The pins might further be replaced by rods of soft solder having their one end soldered to the bar 3 and their other end soldered to the plate 7.

In this form of construction, as previously stated, the bar 3 forms an integral element with the rod 9 which carries the nose-plate 8.

It will be understood that, as illustrated in Figure 4, the rod 9 carrying the nose-plate may be made separate from the torsion bar 3, said rod 9 being secured, for instance soldered, to the main bar 5 at a point 10 separate from the point 4.

In the form of construction shown in Figure 5, the arrangement is similar to Figures 1 to 3, that is, the torsion bar 3 is integral with the nose-plate-carrying rod 9. The only difference with the construction of Figures 1 to 3 lies in the fact that, whereas the unit comprising the torsion bar 3 and the rod 9 is soldered, likewise at 4, to the main bar 5, the opposite end of said torsion bar 3 is mounted slidably in a bushing 11 which is secured, e.g. by solder, as shown at 12 in Figure 6, to the main bar 5. The result of this arrangement is to impart an additional degree of freedom to the torsion bar 3 which is not only able to twist under the effect of the stresses exerted on the glass (impacts or positional adjustment of the glass), but may further be distorted in a direction substantially perpendicular to the surface of the glass, owing to the sliding movement of the end of the bar 3 in the bushing 11.

In all of the above discussed embodiments, the glass 1 is located behind the main bar 5 of the spectacles, as is especially apparent from Figures 1, 3 and 4.

The arrangement shown in Figure 7 is similar to the foregoing arrangements, but in it the top edge surface of the glass 1 assumes a position underlying the main bar 5. For this purpose, the torsion bar 3 is provided at 13 with a downwardly displaced portion, which may be made to carry the points of attachment 2a and 2'a of the glass 1. The glass may be mounted on the displaced portion of 2 and 2a in exactly the same way as in the foregoing instance (see Figure 3) by means of pins 6 extending through the glass and integral with a small retainer plate on the front side of the glasses and soldered at its rear end to a plate 15.

In all of the foregoing embodiments, the bar 3 is stressed mainly in torsion, so that it can serve as a shock-absorber should the glasses be subjected to an impact for example.

Moreover, by suitably twisting the bar, the glass may be adjusted in position with respect to the wearer's eye. The bar is also adapted to operate partly in flexure, since it is only secured at its opposite ends to the main bar 5 of the spectacles, but nevertheless it is designed primarily for torsional operation.

An assembly of comparatively great flexibility is thus provided adapted to avert mishaps in case of shock and further allowing a certain degree of adjustment of the glass relative to the user's eye to be made. The flexibility of the torsion bar may be adjusted at will by acting on the cross section of the bar, on the character of the material from which it is made and on the spacing between points of attachment 4 and 4'. In some cases (where glass is used for example) where high flexibility is required, the points 4 and 4' may be spaced a large distance from each other. In other cases where flexibility is not an especial requisite (in the case of rimmed glasses for instance) the points 4 and 4' may be spaced a minimum distance apart. In the latter event the bar 3 may nevertheless remain quite long, but its attachment will be effected at points as close as possible to each other.

In all of the examples described so far, it was assumed that the glass 1 was mounted directly on the bar 3, but it will be evident that the glass might alternatively be mounted in a rim, made e.g. of plastic material, in turn having its upper edge secured to the torsion bar 3. Furthermore, the element 1 described herein as a "glass" is not necessarily made of glass but may be made of a transparent plastic.

Figure 9 illustrates an embodiment very similar to that of Figure 1 in that it again includes a torsion bar 3 soldered to the main bar 5 at the points 4 and 4', this torsion bar being extended beyond the point 4' as a rod 9 carrying the nose-rest 8.

The difference over the construction shown in Figure 1 lies in that the points of attachment of the glass 1 with the torsion bar 3, rather than being close together as were the points 2 and 2' of Figure 1, are widely-spaced points 2b—2'b somewhat close to the attachment points 4 and 4' of the torsion bar to the main bar 5.

Figure 10 illustrates a structural modification wherein the torsion bar 3 of Figure 1 is, so to speak, divided in two so as to define two torsion bars, viz. (1) a bar 3a on the side of the nose-bridge, secured in any suitable way as by solder at the points 4a—4b to the main bar 5, this torsion bar 3a being for example extended— though this is not essential—by a nose-rest carrying rod 9; and (2) a torsion bar 3'a on the side near the hinged connections with the branches of the spectacles, this bar likewise being secured in any suitable manner, e.g. by solder, at 4'a and 4'b to the main bar 5.

Provided on each of these torsion bars is a point of attachment 2b or 2'b for each glass (or the surrounding rim) similar to the points 2b and 2'b of the figures described above.

The attachment of each glass or the rim surrounding it at the points 2b and 2'b may be effected by means similar to those described and shown in Figure 3.

It is superfluous to described such means more amply at this point, since the only difference resides in the fact that the connecting points rigid with the torsion bar 3 or the torsion bars 3a and 3'a at the points 2b and 2'b, rather than being integrally connected, are separate from each other.

In both forms of embodiment just described, the glass 1 or the rim mounting it is secured behind the main bar 5. The forms of construction now to be described relate to the case where the glass—or the surrounding rim—is mounted beneath the main bar. These forms of construction may be regarded as modifications of the construction shown in Figure 7.

In the construction shown in Figure 11, a torsion bar 3 is used for supporting the glasses, secured to the main bar 5 at both its ends at 4 and 4', but the difference over the construction shown in Figure 7 is that the points of attachment for each glass, such as 2a and 2'a (see Figure 7), instead of being provided at closely spaced locations and on a common displaced portion 13 (Figure 7) of the torsion bar, are remote from each other and provided on two separate displaced portions 13a and 13'a of the torsion bar 3.

This bar may, moreover, if desired be soldered at an intermediate point 10 to the main bar 5.

In the form of embodiment shown in Figure 11, the nose-rest carrier rod 9 is secured independently of the torsion bar on the main bar 5, but the nose-rest carrier rod 9 might alternatively, if desired, be provided as an extension of the torsion bar 3 beyond the point of attachment 4.

Figure 12 represents a modification of the embodiment of Figure 11. In this modification, the torsion bar 3 has been divided in two so as to obtain two separate torsion bars as in the form of construction of Figure 10, namely the torsion bars 3b and 3'b provided with their respective displaced portions 13a and 13'a which carry the pins 2c and 2'c for attaching the glasses.

In this construction, provision is also made for securing the plate 9 to the main bar 4 of the spectacles independently of the torsion bar, but it will be obvious that it might alternatively be provided as an extension of the torsion bar 3b beyond the attachment point 4 thereof with the main bar.

Figure 13:
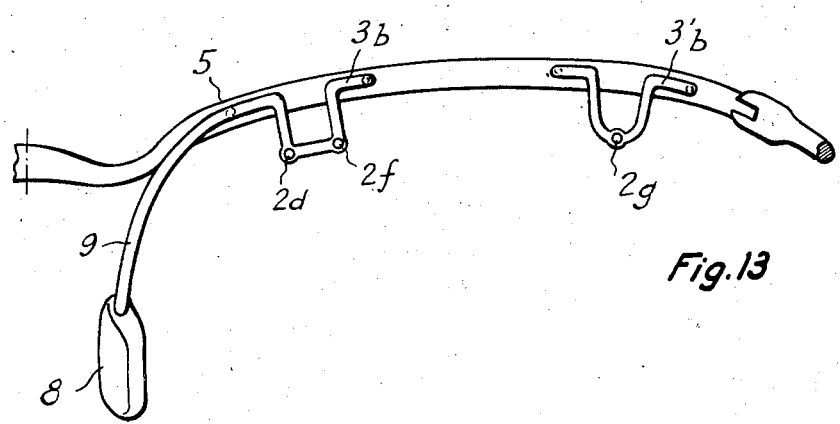

In Figure 13, a modification is shown similar to Figure 12, but wherein two glass securing points 2d and 2f are provided on the torsion bar 3b, since two such pins may be necessary in some cases.

The other torsion bar 3'b is similar to that shown in Figure 12.

In the form of construction of Figure 13, the nose-rest carrier rod 9 is integrally connected to the torsion bar 3 and forms an extension thereof, but it might be provided independent as was the case in Figure 12. In the form of construction of Figure 13, moreover, it would be feasible to provide two points of attachment for the glasses to the torsion bar 3'b, instead of a single attachment point 2g.

Figure 14:
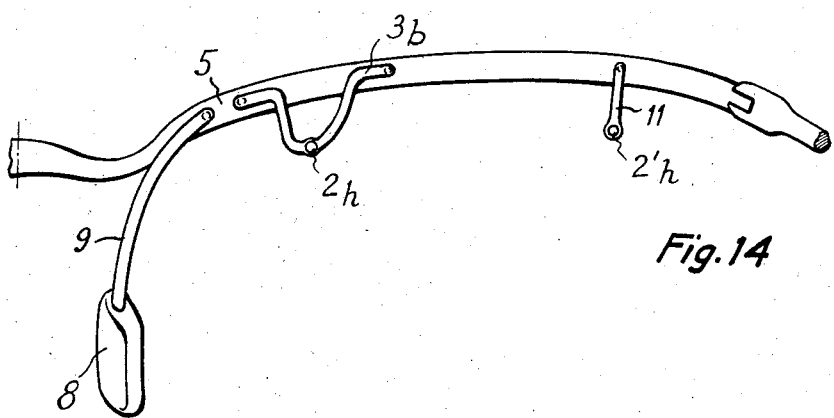

In Figure 14 finally a modification of Figure 13 is shown wherein the second torsion bar 3'b is replaced by a rigid point of attachment provided by a simple lug 11 secured in any appropriate way to the main bar 5 and having at its lower end the point of attachment 2'h for the glass or the glass mounting rim. The other point of attachment is at 2h upon the torsion bar 3b.

If desired, in the event the nose-rest carrier lug is provided separate from the torsion bar 3b, the locations of the torsion bar 3b and of the fixed lug 11 may be inverted.

It will be seen from the foregoing description and the exemplary constructions described that the means for mounting the glasses or the supporting means thereof, is susceptible of assuming a great many modified forms only a few principal ones of which have been indicated by way of example.

Choice of a particular one of these forms will depend on the strength of the materials used, the weight of the elements suspended on the main bar and from considerations involving available space, the nature of the materials employed, the size of the glasses and other factors. Generally, however, the main consideration is to provide for the glass a resilient mounting permitting some degree of movement relative to the main supporting bar in a direction substantially perpendicular to the plane of the glass, thereby to absorb shocks imparted to the glass, but substantially preventing movement of the glass relative to the main bar in the plane of the glass, thereby preventing misalignment of the optical axis of the glass relative to the center of the main bar.

What I claim is:

A pair of spectacles comprising a main bar adapted to extend from temple to temple of the wearer, an optical element-supporting member with substantial torsional flexibility extending parallel to, contiguous with and behind said main bar between two points spaced along said bar, one of said points being adjacent the wearer's nose and the other being adjacent the wearer's temple, means affixing said member to said bar at both of said points to retain said member and bar parallel and contiguous, an optical element, and means affixing said optical element to said member at two points on said member adjacent the mid-point thereof between said first-named points thereby to retain said optical element against swinging movement in its own plane, said first-named points being spaced by a major fraction of the dimension of said optical element parallel to said bar thereby to determine maximum torsional flexibility of said member, said member extending downwardly from said one of said first-named points for support of the spectacles from the wearer's nose.

References Cited in the file of this patent

UNITED STATES PATENTS

| | | |
|---|---|---|
| 2,254,749 | Nerney | Sept. 2, 1941 |
| 2,518,914 | Lissac | Aug. 15, 1950 |

FOREIGN PATENTS

| | | |
|---|---|---|
| 369,802 | Great Britain | Mar. 31, 1932 |
| 498,023 | Belgium | Mar. 9, 1951 |
| 154,988 | Australia | June 5, 1952 |
| 509,465 | Belgium | Mar. 15, 1952 |
| 1,030,174 | France | Mar. 11, 1953 |